United States Patent [19]

Shaw

[11] 4,113,205
[45] Sep. 12, 1978

[54] AERODYNAMIC LIFTING MECHANISMS

[75] Inventor: Harry Shaw, Aldershot, England

[73] Assignee: The Secretary of State for Defence in Her Britannic Majesty's Government of the United Kingdom of Great Britain and Northern Ireland, London, England

[21] Appl. No.: 804,237

[22] Filed: Jun. 7, 1977

[30] Foreign Application Priority Data

Jun. 16, 1976 [GB] United Kingdom ............... 24987/76

[51] Int. Cl.² ............................................. B64C 39/00
[52] U.S. Cl. ....................................... 244/20; 115/50; 416/7
[58] Field of Search .................... 244/4 R, 20, 19, 9; 115/1 R, 63, 49, 50, 64; 416/7, 8

[56] References Cited

U.S. PATENT DOCUMENTS

| | | | |
|---|---|---|---|
| 1,632,811 | 6/1927 | Watter | 244/20 |
| 1,764,820 | 6/1930 | Baker | 416/8 |
| 2,548,615 | 4/1951 | Petr, Jr. | 416/8 |
| 2,739,768 | 3/1956 | Purpura | 244/20 |
| 2,941,494 | 6/1960 | McBride | 115/63 |
| 3,730,643 | 5/1973 | Davison | 416/8 |
| 3,938,759 | 2/1976 | Bastide | 244/20 |

FOREIGN PATENT DOCUMENTS 9,177 of 1914 United Kingdom ................... 244/4 R

OTHER PUBLICATIONS

"Windmills Round the World", The Heating and Ventalation Engineer 10-1976 pp. 19-20.

Primary Examiner—Galen L. Barefoot
Attorney, Agent, or Firm—Cushman, Darby & Cushman

[57] ABSTRACT

An aerodynamic lift mechanism comprises a plurality of aerofoils mounted on two continuous toothed belts which are driven by toothed pulleys. A lever connects each aerofoil to a continuous member which substantially follows the contour of the belts but which is movable relative to the belts. Movement of the continuous member alters the angles of attack of the aerofoils.

1 Claim, 4 Drawing Figures

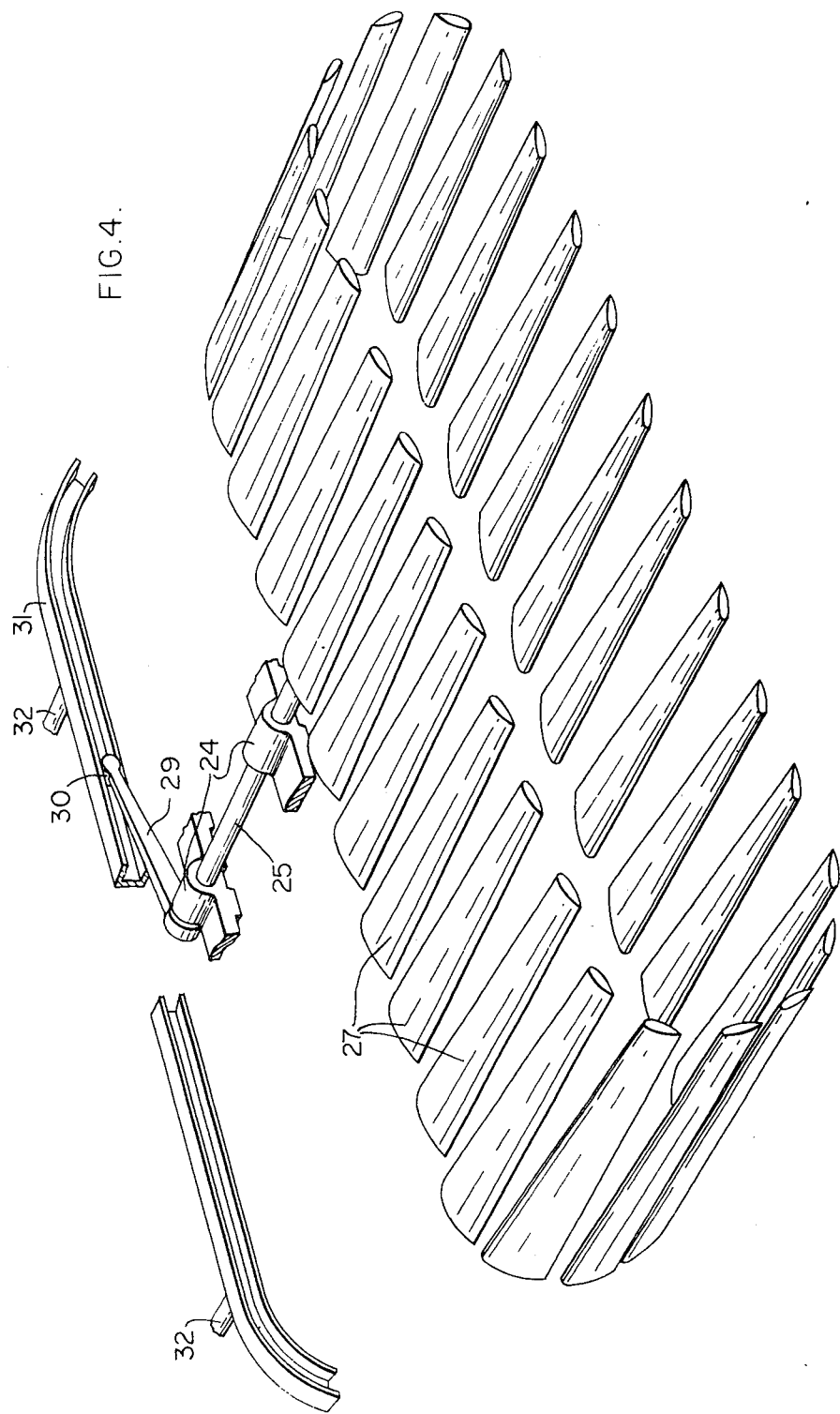

AERODYNAMIC LIFTING MECHANISMS

The present invention relates to aerodynamic lift mechanisms for aircraft and to aircraft embodying such mechanisms. The invention is particularly, but not exclusively, directed towards lift mechanisms for small vertical take-off aircraft.

Many vertical take-off aircraft are currently used for a wide variety of purposes. The commonest example of a vertical take-off aircraft is the helicopter. However even the smallest helicopter is very noisy. The reason for this is that the rotor blades, upon which is depends for lift, are, at their tips, moving extremely rapidly relative to the air. This results in localised shock waves forming at the rotor tips. Helicopter rotors are extremely complicated mechanisms, and are comparatively inefficient as the inner and outer portions of the blades contribute comparatively little lift, due to relative low velocities and tip effects respectively. Of other types of vertical take-off aircraft the best known is the type wherein a gas turbine propulsion unit of a more or less conventional aircraft is provided with rotatable nozzles which provide a vertical lift capability. This type of aircraft is extremely noisy and expensive.

The present invention provides a lift mechanism which will enable small cheap and extremely quiet vertical take-off aircraft to be produced.

According to the present invention an aerodynamic lift mechanism for an aircraft includes a drivable first shaft having axially spaced first and second toothed pulleys secured thereto; a second shaft parallel to the first shaft and having first and second toothed pulleys mounted thereon in co-planar relationship respectively with the first and second pulleys on the first shaft; a first continuous toothed belt connecting the first pulleys and a second continuous toothed belt connecting the second pulleys; a plurality of aerofoils mounted on and perpendicular to the first and second pulleys and means for varying the angles of attack of the aerofoils.

Aerofoils are preferably mounted between the first and second belts, and may also be mounted on the second belt extending away from the first belt.

The second shaft may also be drivable and may have the pulleys mounted thereon secured to it. Alternatively the second shaft may be fixed with pulleys rotatably mounted thereon.

The pulleys on the first shaft may be of the same, or of different, diameter as the pulleys on the second shaft.

The toothed belts may be made from fibre reinforced plastic, suitable fibres being, for example, glass or carbon fibre. The aerofoils, for reasons which will become apparent, are preferably uncambered and may be constructed, for example, from light plastic.

A preferred form of aircraft having lift mechanisms according to the invention has a body and lift mechanism on each side of the body, the lift mechanisms being symmetrically disposed.

The nature of the invention, and the manner in which it works will be better understood by reference to the following description of one embodiment of the invention, which is described by way of example only, with reference to the accompanying diagrammatic drawings of which:

Figure 1:
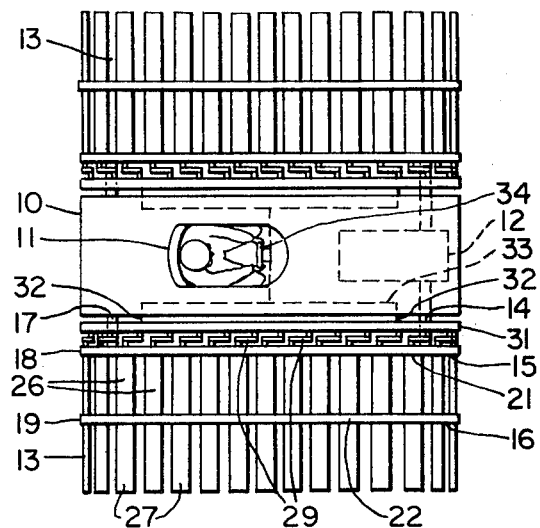
FIG. 1 is a plan view of an aircraft embodying the invention.
Figure 2:
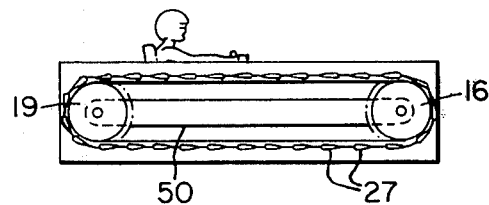
FIG. 2 is an elevation of the aircraft.

FIG. 4 is a detail of the mounting of an aerofoil on the belts and of a means for varying the angles of attack of the aerofoils. A vertical take-off aircraft (FIGS. 1 and 2) has body 10 having a crew compartment 11, an engine 12, and two lift mechanisms as shown generally at 13. One of the lift mechanisms 13 will now be described. A first shaft 14 mounted on the body 10 and drivable by the engine 12 carries a first pulley as indicated at 15 and a second pulley 16 (FIG. 2). A second shaft 17 mounted on the body 10 extends parallel to the first shaft 14. Mounted on the second shaft 17 are, at 18, a first pulley (not shown) and a second pulley 19 (FIG. 2). Pulleys 15 and 18 lie in the same plane, and pulleys 16 and 19 lie in the same plane.

Figure 3:
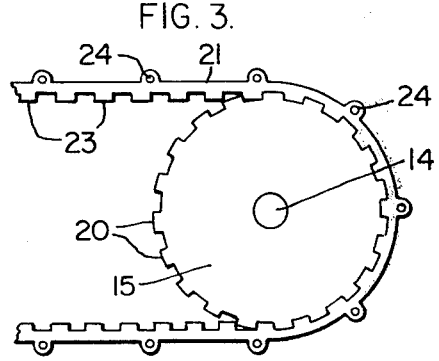
FIG. 3 is a detail view of a pulley and part of a belt.

Each pulley 15, 16, 18, 19, one of which 15, is shown in detail in FIG. 3 has on its periphery teeth such as those shown at 20. A continuous belt 21 connects the pulleys 15, 18, and a continuous belt 22 connects the pulleys 16, 19. Each belt 21, 22 has teeth such as those shown at 23 which mate with the teeth 20 of the pulleys 15 and 18, and 16 and 19 respectively. Each belt 21, 22 carries trunnion eyes such as those shown at 24. The trunnion eyes 24 are evenly spaced along the length of the belts, and the belts 21, 22 are positioned so that eyes 24 thereon are aligned. A subshaft 25 (FIG. 4) is rotatably carried in each aligned pair of trunnion eyes 24. Mounted on each subshaft and extending between the belts 21, 22 is a camberless aerofoil such as those shown at 26 in FIG. 1 (but for clarity, omitted from FIG. 4). Also mounted on each subshaft, outboard of belt 22 is a camberless aerofoil such as those shown at 27. The aerofoils 26, 27 are preferably, but not necessarily, of identical section.

Secured to an extension of each subshaft 25 inboard of the belt 21 is a lever 29. A slipper block 30 pivotably attached to the end of the lever 29 remote from the subshaft 25 slidably fits within a continuous member in the form of a U-shaped channel 31 which substantially follows the contour of the belt 21, 22. The channel 31 is carried on support members such as those shown 32, which are connected via a control system roughly indicated by the dotted lines 33 in FIG. 1 to a control column 34.

In operation the engine 12 drives the shaft 14 which causes the pulleys 15, 16 to rotate so driving the belts 21, 22 and hence moving the aerofoils relative to the ambient air. Movement of the control column 34 to raise the channel 31 relative to the belts 21, 22 rotates the levers 29 and hence the subshafts 25 to rotate the aerofoils 26, 27 and gives the aerofoils positive incidence. Lift is thus generated, the lift increasing as the incidence of the blades increases (providing that the stalling angle of the blades is not exceeded). It will be appreciated that with this arrangement, the aerofoils being uncambered, lift will be generated by all aerofoils apart from those traversing the pulleys. Preferably the channel 31 is so designed that aerofoils traversing the pulleys have zero incidence. It is estimated that with two lift mechanisms 13, with pulleys having 2ft diameter spaced at 10ft centres, with aerofoils 26, 27 having a total of a 3ft span, moving at 100ft/sec, a lift force of over 400lbs could be obtained.

Preferably the lifting mechanisms 13 are attached to the body 10 with a slight dihedral, control in yaw being obtained by concentrating lift forces in diagonal corners. It will be appreciated that the control mechanism should be such as to allow tilting of the channels 31 relative to the belts 21, 22. Roll control can be accomplished by the application of asymmetric lift control.

It will be appreciated that many variations are possible in the embodiment of the invention described above with reference to FIGS. 1-4. For example the shaft 17 may be rotatably mounted in the body 10, with the pulleys 18, 19 secured thereto. Alternatively, the shaft 17 may be fixed with the pulleys 18, 19 rotatably mounted thereon.

The embodiment described has been kept as simple as possible to simplify understanding of the invention. It will be realised that with additional expense and complication considerably larger and more complicated aircraft could be produced. For example structure attached to the body 10 and shrouding the fore and aft portions of the mechanism could support stiffening structure outboard of the aerofoil 27. Alternatively, a plurality of lift mechanisms 13, could be installed in cut-outs in wings of substantially conventional design, allowing for the production of large aircraft.

Propulsion of aircraft according to the invention may be achieved simply by tilting the whole aircraft relative to the ground, as is done in helicopters, by auxiliary drive means, such as a propeller driven by the motor 12 or by an auxiliary drive unit, or even by exhaust from the motor 12.

It will be realised that with the aerofoils operating at such comparatively low speeds very little aerodynamic noise will be generated. Also motors 12 can be greatly silenced particularly where, as is envisaged for a small aircraft, internal combustion engines are used.

To assist in manufacture of the lift mechanisms, and in maintenance of aircraft on which they are installed, the shafts 14, 17 can be mounted on a rigid member 50 (FIG. 2) which can be secured to or detached from the body 10.

What I claim is:

1. An aircraft comprising:

a body with two sides;
an engine mounted within said body;
means on each side of said body for lifting said aircraft including: a first shaft extending in a horizontal plane and perpendicular to the direction of flight of said aircraft, rotatably mounted and drivable by said engine; first and second toothed pulleys axially spaced apart on and secured to said first shaft for rotation therewith; a second shaft horizontally spaced apart from and extending parallel to said first shaft; first and second rotatable toothed pulleys mounted on said second shaft in co-planar relationship respectively with said first and second pulleys on said first shaft; a first continuous toothed belt connecting said first pulleys and having a plurality of trunnion eyes; a second continuous toothed belt connecting said second pulleys and having a plurality of trunnion eyes; a plurality of sub-shafts rotatably mounted in said trunnion eyes and extending between said first and second belts; an aerofoil mounted on each of said sub-shafts between said first and second belts; an aerofoil mounted on each of said sub-shafts outboard of said second belt; for each of said sub-shafts, a lever having a first end secured to said sub-shaft, each said lever having a second end; a continuous member movably mounted on said body, said continuous member having a contour which substantially follows the contours of said first and second belts; said second ends of said levers being constrained to follow said contours of said continuous member; and
a control member, operable by a pilot, operatively connected to said continuous members on each side of said body for moving said continuous member relative to said body and hence to said belts and so varying the angles of attack of said aerofoils relative to airflow past said aircraft.

* * * * *